United States Patent Office 3,324,138
Patented June 6, 1967

3,324,138
QUINUCLIDIN-3-YL-ESTER OF 10,11-DIHYDRO-5H-DIBENZO[a,d]CYCLOHEPTEN - 5 - YL - ACETIC ACID
Cornelis van der Stelt, Haarlem, North Holland, Netherlands, assignor to N.V. Koninklijke Pharmaceutische Fabrieken v/h Brocades Stheeman en Pharmacia, Amsterdam, Netherlands, a corporation of Dutch law
No Drawing. Filed July 27, 1964, Ser. No. 385,455
Claims priority, application Great Britain, Dec. 3, 1963, 47,786/63
1 Claim. (Cl. 260—294.3)

This invention relates to new therapeutically useful esters of dibenzocyclohepten-5-yl-acetic acid and to acid addition salts of these esters, to processes for their preparation and to pharmaceutical preparations containing them.

According to the present invention, the new dibenzocyclohepten-5-yl-acetic acid esters have the formula:

(I)
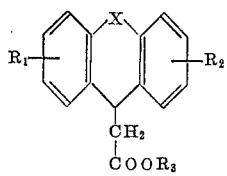

wherein X represents a —$CH_2$—$CH_2$— or —CH=CH— group, $R_1$ and $R_2$ each represents a hydrogen or halogen atom or a lower alkyl group, and $R_3$ represents a basic nitrogen-containing radical containing up to 18 atoms.

Among the suitable radicals represented by the symbol $R_3$ are (lower alkyl)amino-lower alkyl; di(lower alkyl) amino-lower alkyl; saturated (N - heterocyclic) - lower alkyl, as exemplified by ω-(N-piperidino)-lower alkyl, ω-(N-morpholino)-lower alkyl and ω-(N-thiamorpholino)-lower alkyl; saturated 5 to 7 membered monocyclic N-heterocyclic radicals of less than twelve carbon atoms, as exemplified by piperidin-3-yl, piperidin-4-yl, 1-lower alkyl-piperidin-3-yl, 1-lower alkyl-piperidin-4-yl, pyrrolidin-3-yl, 1-lower alkyl-pyrrolidin-3-yl; and bicyclic N-heterocyclic radicals of less than twelve carbon atoms, as exemplified by tropan-3-yl, nortropan-3-yl, 8-lower alkyltropan-3-yl, e.g., 8-methyltropan-3-yl, 8-aralkyltropan-3-yl, e.g., 8-phenyl-lower alkyl-tropan-3-yl, such as 8-benzyltropan-3-yl, and quinuclidinyl.

The term "lower alkyl" as employed herein includes both straight and branched chain radicals of less than eight carbon atoms. All four halogens are included within the scope of the invention but chlorine and bromine are preferred. The particularly preferred compounds are those wherein X is a —$CH_2$—$CH_2$— group, $R_1$ and $R_2$ each represent a hydrogen atom and $R_3$ is a di(lower alkyl) amino-lower alkyl, or tropan-3-yl group.

As to the salts, those coming within the purview of this invention include the acid addition salts, particularly the non-toxic acid addition salts. Acids useful for preparing these acid addition salts include, inter alia, inorganic acids, such as the hydrohalic acids (e.g. hydrochloric and hydrobromic acid), sulphuric acid, nitric acid, boric acid and phosphoric acid, and organic acids, such as oxalic, fumaric, tartaric, citric, acetic, succinic, pamoic and maleic acid.

The esters of this invention and acid addition salts thereof are therapeutically active compounds which possess cardiac regulatory properties and are useful in treating cardiac arrhythmia. The compounds of this invention can be administered perorally in dosage forms such as those described later, the dosage for such treatment being adjusted for the activity of the particular compound employed.

According to a feature of the invention, the compounds of Formula I are prepared by reacting and under esterification conditions a dibenzocyclohepten-5-yl-acetic acid of the formula (II)
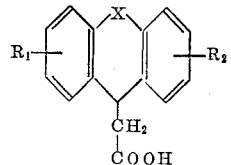

wherein the symbols have the same meanings already defined, or a reactive functional derivative thereof such as a halide or the anhydride, with an alcohol of the formula $R_3OH$ (where $R_3$ is as hereinbefore defined), or alternatively by reacting a salt (e.g., an alkali metal salt such as the sodium salt) of the aforesaid acid with a reactive functional derivative of the alcohol $R_3OH$, e.g., a hydrohalic acid ester, preferably the chloride, in an organic solvent such as benzene.

Suitable dibenzocyclohepten-5-yl-acetic acids which can be used as reagents in the above reaction are, for example (10,11-dihydro-5H-dibenzo[a,d]cyclohepten-5-yl)acetic acid;
(1,2,3 or 4-chloro-10,11-dihydro-5H-dibenzo[a,d]cyclohepten-5-yl)acetic acid;
(1,2,3 or 4-bromo-10,11-dihydro-5H-dibenzo[a,d]cyclohepten-5-yl)acetic acid;
(1,2,3 or 4-methyl-10,11-dihydro-5H-dibenzo[a,d]cyclohepten-5-yl)acetic acid;
(1,2,3 or 4-ethyl-10,11-dihydro-5H-dibenzo [a,d]cyclohepten-5-yl)acetic acid;
(1,2,3 or 4-isopropyl-10,11-dihydro-5H-dibenzo[a,d]cyclohepten-5-yl)acetic acid;
(1,2,3 or 4-t-butyl-10,11-dihydro-5H-dibenzo[a,d]cyclohepten-5-yl)acetic acid;
(1,3 or 1,7 or 3,7-dimethyl-10,11-dihydro-5H-dibenzo[a,d]cyclohepten-5-yl)acetic acid;
(1-chloro-3-methyl-10,11-dihydro-5H-dibenzo[a,d]cyclohepten-5-yl)acetic acid;
(5H-dibenzo[a,d]cyclohepten-5-yl)acetic acid;
(1,2,3 or 4-chloro-5H-dibenzo[a,d]cyclohepten-5-yl) acetic acid;
(1,2,3 or 4-bromo-5H-dibenzo[a,d]cyclohepten-5-yl) acetic acid;
1,2,3 or 4-methyl-5H-dibenzo[a,d]cyclohepten-5-yl) acetic acid;
(1,2,3 or 4-ethyl-5H-dibenzo[a,d]cyclohepten-5-yl) acetic acid;
(1,2,3 or 4-isoproyl-5H-dibenzo[a,d]cyclohepten-5-yl) acetic acid;
(1,2,3 or 4-t-butyl-5H-dibenzo[a,d]cyclohepten-5-yl) acetic acid;
(1,3 or 1,7 or 3,7-dimethyl-5H-dibenzo[a,d]cyclohepten-5-yl)acetic acid; and
(1-chloro-3-methyl-5H-dibenzo[a,d]cyclohepten-5-yl) acetic acid.

The starting materials of Formula II can be prepared in several ways. According to one method, a ketone of the formula (III)
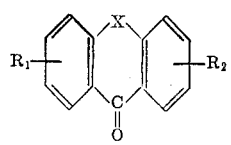

(X, $R_1$ and $R_2$ in Formula III and the succeeding formulas are as hereinbefore defined) is reacted with acetylene in a medium of liquid ammonia and in the presence of a condensing agent, such as sodamide, to yield an actylenic compound of the formula (IV) 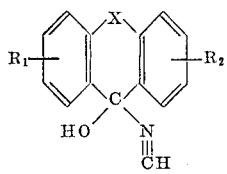

which is caused to isomerize by treatment with an acid under the conditions of the Meyer-Schuster reaction, to give an aldehyde of the formula (V) 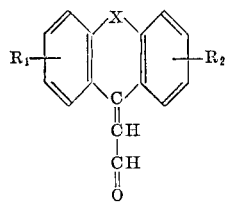

which thereafter is oxidized to give the corresponding unsaturated acid of the formula (VI) 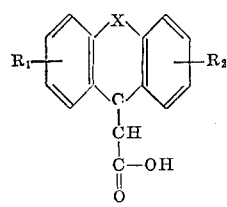

A suitable agent for effecting the oxidation is silver oxide. The oxidation is preferably effected in an alcoholic solution of an alkali hydroxide. The unsaturated acid of Formula VI is then reduced to give an acid of general Formula II by reaction with hydrogen in the presence of a Raney nickel catalyst.

According to another method for preparing the starting materials of Formula II, the ketone of the Formula III is first reduced in conventional manner to yield the corresponding alcohol which thereupon is reacted with cyanacetic acid using the method described by Goldberg and Wragg (J. Chem. Soc. 1957, 4823) to yield a compound of the formula (VII) 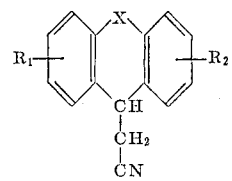

The nitrile is then subjected to saponification in an alkaline medium.

According to a further method, the ketone of Formula III is first reduced to form the corresponding alcohol which is then converted into a halogen substituted compound of the formula (VIII) 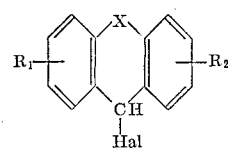

Hal represents a halogen (preferably a chlorine) atom. The compound of the Formula VIII is then interacted with a compound of the formula (IX) 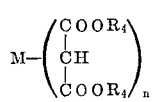

[wherein $n$ represents 1 or 2, $R_4$ represents a lower alkyl (preferably ethyl) group and M is an alkali metal atom if $n=1$ or an alkaline earth metal atom, preferably a magnesium atom, if $n=2$]. The reaction is preferably conducted in the presence of an inert organic solvent such as diethyl ether or tetrahydrofuran. After hydrolysis of the metal complex and saponification of the resultant ester, a malonic acid of the formula (X) 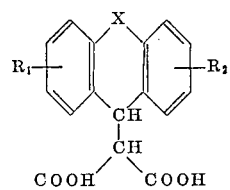

is obtained, which is decarboxylated yielding a dibenzocycloheptyl acetic acid of the Formula II.

According to a still further method, a compound of the Formula VIII is reacted with a metal derivative of ethyl acetoacetate yielding a compound of the formula (XI) 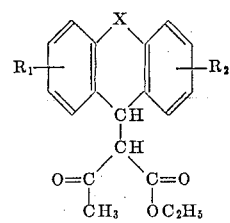

As a metal derivative of ethyl acetoacetate, the copper derivative is preferably used. The reaction is carried out in an inert organic solvent such as benzene. The compounds of Formula XI are converted into the acids of Formula II upon treatment with a solution of an alkali metal hydroxide in an alcohol such as ethanol.

According to another method, a ketone of the Formula III is first reduced to the corresponding alcohol which thereupon is reacted with malonic acid, preferably in a medium of acetic acid. The dibenzocyclohepten-5-yl-malonic acid formed is converted into the corresponding dibenzocyclohepten-5-yl acetic acid either by heating as such or in a pyridine solution. The following procedures, in which the temperatures mentioned are in degree centigrade and the percentage yields mentioned are related to the theoretical yield, illustrate the preparation of starting materials conforming to Formula II.

PROCEDURE I

A one liter flask is fitted with a dropping-funnel, a gas-inlet tube filled with solid potassium hydroxide, and a condenser to the upper end of which a tube filled with solid potassium hydroxide is attached. Flask and condenser are cooled with solid carbon dioxide in acetone. From a gas cylinder a quantity of about 200–250 ml. of ammonia is condensed into the flask through the tube filled with potassium hydroxide. Another flask, fitted with an inlet tube nearly reaching to the bottom, an outlet tube and an ascending tube is filled with water. The inlet tube is connected with two washing-bottles placed in series and filled with concentrated sulphuric acid and with a tower filled with glass-wool. The latter system is connected with a supply of nitrogen gas. The air is completely replaced by nitrogen by bubbling same through the system. The nitrogen supply is switched off and a stream of acetylene gas is passed through the flask containing water (to remove acetone vapor stemming from the acetone soaked diatomaceous earth, wherein the acetylene is dissolved in the cylinder). The outlet of the tower is then connected with the inlet tube of the flask containing the liquid ammonia. 0.2 gram atom of sodium in the form of small pieces is added to the ammonia, while acetylene is being passed through. If the sodium is added too rapidly the solution turns blue. When the total quantity of sodium has been added (time needed about 30 minutes) the stream of acetylene is throttled down, and thereafter 0.2 mol of 10,11-dihydro-5H-dibenzo[a,d]cyclohepten - 5 - one dissolved in about 350 ml. of ether is added during the course of about 45 minutes. Then the acetylene supply is cut off, and the reaction mixture is left to react at a temperature of about −60 to −50°. The flask is kept standing overnight without stirring or cooling so as to let the ammonia evaporate. The reaction mixture is then diluted with water, the ether layer is separated, extracted with water and dried with anhydrous sodium sulphate. The ethereal solution is concentrated after filtration, and petroleum ether (boiling range 28–40°) is added to the residue. The precipitated solid is collected and crystallized from petroleum ether (boiling range 40–60°). 5-Ethynyl-10,11-dihydro-5H-dibenzo[a,d]cyclohepten - 5 - ol, melting at 72.5–73°, is obtained in 82% yield.

To a refluxing mixture of 50 ml. of ethanol (96%), 15 ml. of water and 5 g. of concentrated sulphuric acid, there is added over a period of 30 minutes 10 g. of 5-ethynyl - 10,11 - dihydro - 5H - dibenzo[a,d]cyclohepten-5-ol dissolved in 25 ml. of ethanol (96%). At the end of the addition, the reaction mixture is boiled under reflux for about 15 minutes and then poured onto ice after chilling. The resulting solid is filtered off and crystallized from petroleum ether (boiling range 40–60°). 10,11-dihydro - 5H - dibenzo[a,d]cyclohept - 5 - ylidene-acetaldehyde, melting point 70.5–72°, is obtained in 90% yield.

To a mixture of 88 g. of 10,11 - dihydro - 5H - dibenzo[a,d]cyclohept - 5 - ylidene - acetaldehyde in 900 ml. of ethanol, and 110.5 g. of silver nitrate in 110 ml. of distilled water a solution of 90 g. of potassium hydroxide in 220 ml. of water and 870 ml. of ethanol is added dropwise with stirring at a temperature below 30°. Stirring is continued until the temperature starts to drop. The precipitate is filtered off and washed with ethanol and with boiling water. The filtrate is diluted with water and acidified with nitric acid. A precipitate consisting of crude 10,11 - dihydro - 5H - dibenzo[a,d]cyclohept-5 - ylidene - acetic acid is collected. The compound is purified by crystallization from ethanol. Melting point 168–170°. Yield 60%.

50 grams of 10,11 - dihydro - 5H - dibenzo[a,d]cyclohept - 5 - ylidene - acetic acid are dissolved in ethanol. 8 grams of sodium hydroxide in ethanol are added. Reduction is carried out at a hydrogen pressure of three atmospheres using Raney nickel as catalyst. After the theoretical quantity of hydrogen has been taken up, the catalyst is filtered off and the ethanol is removed by distillation. The residue is dissolved in water and the solution acidified with hydrochloric acid. 10,11 - dihydro - 5H-dibenzo[a,d]cyclohepten - 5 - yl - acetic acid is filtered off and purified by crystallization from ethyl acetate. Melting point 159–161°. Yield 80%.

*Analysis.*—Calcd. for $C_{17}H_{16}O_2$: C, 80.92%; H, 6.39%. Found: C, 80.2%; H, 6.2%.

Similarly, by substituting an equivalent of the following substituted 10,11 - dihydro - 5H - bidenzo [a,d]cyclohepten - 5 - ones for the 10,11 - dihydro - 5H - dibenzo [a,d]cyclohepten - 5 - one in Procedure I, the indicated substituted 10,11 - dihydro - 5H - dibenzo [a,d]cyclohepten - 5 - yl acetic acids are prepared:

| Substituted 10,11-dihydro-5H-dibenzo [a,d]cyclohepten-5-one | Substituted 10,11-dihydro-5H-dibenzo [a,d]cyclohepten-5-yl acetic acid |
| --- | --- |
| 1-chloro | 1-chloro |
| 2-bromo | 2-bromo |
| 3-methyl | 3-methyl |
| 4-methyl | 4-methyl |
| 3-isopropyl | 3-isopropyl |
| 1-ethyl | 1-ethyl |
| 1,3-dimethyl | 1,3-dimethyl |
| 3,7-dimethyl | 3,7-dimethyl |

PROCEDURE II

A mixture of 73.5 g. of 10,11 - dihydro - 5H - dibenzo [a,d]cyclohepten - 5 - ol, 42.5 g. of cyanacetic acid and 17 g. of anhydrous zinc chloride in 90 ml. of glacial acetic acid is boiled under reflux for eight hours with stirring. After cooling, the mixture is poured onto water and extracted with diethyl ether. The ethereal solution is quickly washed with a dilute sodium hydroxide solution, and dried with sodium sulphate. After filtration the solvent is evaporated. The residue is boiled under reflux with a mixture of 35 g. of potassium hydroxide, 17 ml. of water and 70 ml. of ethanol for a period of 18 hours. The ethanol is distilled off. After cooling, water and diethyl ether are added to the residue. The layers are separated, the aqueous layer is acidified and extracted with diethyl ether. The ethereal solution is dried with sodium sulphate, filtered and concentrated. Residual 10,11 - dihydro - 5H-dibenzo[a,d]cyclohepten - 5 - yl - acetic acid is crystallized from ethyl acetate. Yield 40%. Melting point 154–157°.

PROCEDURE III 52.25 g. of 10,11 - dihydro - 5H - dibenzo[a,d]cyclohepten - 5 - ol are dissolved in 150 ml. of anhydrous xylene, 24 g. of thionyl chloride are added drop-wise to the solution over a period of about 20 minutes, the solution being stirred and cooled so as to maintain a temperature of about 20° C. After the addition of the thionyl chloride, stirring is continued for another 1½ hours at room temperature. Anhydrous calcium chloride is then added to bind the water formed and the solution is filtered. After removal of the solvent by distillation, a residue consisting of crystalline 10,11 - dihydro - 5H-dibenzo[a,d]cyclohepten - 5 - yl chloride is obtained. The product is crystallized from petroleum ether (boiling range 80–100°), while adding decolorizing charcoal; the chloride with a melting point of 101–103° is obtained in a yield of 92%.

A mixture of 6 g. of magnesium, 40 g. of freshly distilled diethyl malonate and 50 ml. of anhydrous ethanol is boiled under reflux. A few drops of carbon tetrachloride are added and the mixture is kept refluxing until the reaction starts. No further heating is applied and the mixture is stirred until no magnesium is left. Ethanol is distilled off under reduced pressure, 25 ml. of dioxane is added and distilled off again. This procedure is repeated so as to ensure that ethanol is removed as completely as possible. To the residue 100 ml. of anhydrous tetrahydrofuran is added followed by 57.1 g. of 10,11-dihydro - 5H - dibenzo[a,d]cyclohepten - 5 - yl chloride in 200 ml. of tetrahydrofuran. The mixture is boiled under reflux for 4 hours and the tetrahydrofuran is removed by distillation. The residue is decomposed with water and dilute hydrochloric acid and extracted with diethyl ether. The ethereal solutions are dried with sodium sulphate. After filtration the diethyl ether is distilled off and the residue, crude diethyl 10,11 - dihydro - 5H - dibenzo[a,d]cyclohepten - 5 - yl - malonate, refluxed with a solution of 50 g. of potassium hydroxide in 25 ml. of water and 100 ml. of ethanol for a period of 10 hours. The ethanol is distilled off and the residue is dissolved in water and diethyl ether. The ether layer is separated, dried with sodium sulphate, filtered and concentrated by removal of the solvent. The residue (11 g.) appeared to be 10,11 - dihydro - 5 - ethoxy - 5H - dibenzo [a,d]cycloheptene. The alkaline water layer is acidified and extracted with diethyl ether. The etheral solution is dried and filtered. Diethyl ether is distilled off and 59 grams of 10,11 - dihydro - 5H - dibenzo[a,d]cyclohepten - 5 - yl-malonic acid is obtained. Yield 79%. Melting point 186° (decomposition) after crystallization from ethyl acetate.

55 g. of 10,11 - dihydro - 5H - dibenzo[a,d]cyclohepten - 5 - yl - malonic acid is heated at a temperature of 170° until carbon dioxide is no longer evolved. The residue is crystallized from ethyl acetate. 35 g. of 10,11-dihydro - 5H - dibenzo[a,d]cyclohepten - 5 - yl - acetic acid is obtained. Yield 75%. Melting point 157–161°.

Similarly, by substituting an equivalent of the following substituted 5H - dibenzo[a,d]cyclohepten - 5 - ones for the 10,11 - dihydro - 5H - dibenzo [a,d]cyclohepten-5-one in Procedure III, the indicated substituted -5H-dibenzo[a,d]cyclohepten-5-yl acetic acids are prepared:

| Substituted 5H-dibenzo[a,d]-cyclohepten-5-one | Substituted 5H-dibenzo[a,d]-cyclohepten-5-yl acetic acid |
|---|---|
| 1-methyl | 1-methyl |
| 2-ethyl | 2-ethyl |
| 3-tert.-butyl | 3-tert.-butyl |
| 2,4-dimethyl | 2,4-dimethyl |
| 2-isopropyl-10,11-dihydro | 2-isopropyl-10,11-dihydro |

PROCEDURE IV 22.9 g. of 10,11-dihydro-5H-dibenzo[a,d]cyclohepten-5-yl chloride and 16.1 g. of the copper derivative of ethyl acetoacetate are heated under reflux on benzene for a period of 6 hours with stirring. After cooling diethyl ether is added. The precipitate is filtered off. The filtrate is washed with water, with a dilute solution of sodium hydroxide and again with water. It is then dried with sodium sulphate. After filtration, the solvents are distilled off and the residue is crystallized from petroleum ether (boiling range 40–60°). Ethyl 10,11-dihydro-5H-dibenzo[a,d]-cyclohepten - 5-yl-acetoacetate, melting at 79–80°, is obtained in 93% yield.

A mixture of 9.7 g. of ethyl 10,11-dihydro-5H-dibenzo[a,d]-cyclohepten-5-yl-acetoacetate in 150 ml. of ethanol and 150 g. of 50% sodium hydroxide are heated under reflux for a period of 3 hours. Ethanol is distilled off and after cooling diethyl ether and water are added. After separation, the water layer is acidified and extracted with diethyl ether. The ethereal solution is dried with sodium sulphate and 10,11-dihydro-5H-dibenzo[a,d]cyclohepten-5-yl-acetic acid is obtained after filtration and evaporation of the diethyl ether solvent. Yield 54%.

PROCEDURE V 40 g. of 5H-dibenzo[a,d]cyclohepten-5-ol is dispersed in 150 ml. of glacial acetic acid. A solution of 22 g. of malonic acid in 150 ml. of glacial acetic acid is added. The mixture is heated at a temperature of 70° for two hours and left standing overnight at room temperature. Crystalline material is filtered off and dissolved in diethyl ether. To the filtrate water is added. A precipitate is filtered off and dissolved in a sodium hydroxide solution. A small amount of insoluble material is filtered off, the filtrate is acidified, the precipitate filtered off and dissolved in diethyl ether. The ethereal solutions are combined, and washed with water and dried with sodium sulphate. After filtration the solvent is distilled off. The residue, crude 5H-dibenzo[a,d]-cyclohepten-5-yl-malonic acid is crystallized from a mixture of diethyl ether and petroleum ether (boiling range 40–60°). Yield 74%. Melting point 187° (decomposition).

A mixture of 40 g. of 5H-dibenzo[a,d]cyclohepten-5-yl-malonic acid and 110 ml. of pyridine are heated on a water bath for two hours. The warm mixture is poured onto a 15% (by weight) hydrogen chloride solution in water. The 5H-dibenzo[a,d]cyclohepten-5-yl-acetic acid formed is filtered off and dissolved in a mixture of diethyl ether and benzene. The aqueous layer is extracted three times with diethyl ether and the etheral solutions are washed with water and dried with sodium sulphate. After filtration, ether is removed by evaporation. Yield 96% of the acid after crystallization from a mixture of diethyl ether and petroleum ether (boiling range 40–60°). Melting point of the acid is 160–162°.

The following examples, in which the temperatures mentioned are in degrees centigrade and the percentage yields mentioned are related to the theoretical yield, illustrate the preparation of the new compounds of the present invention.

Example 1

A mixture of 15.24 g. of 10,11-dihydro-5H-dibenzo[a,d]cyclohepten-5-yl-acetic acid, 20 ml. of thionyl chloride and 75 ml. of anhydrous benzene is boiled under reflux for one hour. Benzene and excess thionyl chloride are distilled off. The residue is dissolved in 50 ml. of anhydrous benzene and the solution is added dropwise to a refluxing solution of 16.9 g. tropine in 75 ml. of anhydrous benzene. The mixture is kept refluxing for two hours. It is then cooled and precipitated tropine hydrochloride is filtered off. The filtrate is extracted three times with water and acidified with a 2 N hydrochloric acid solution. To the aqueous solution an excess of a 2 N sodium hydroxide solution is added. The basic ester is taken up with diethyl ether. The ethereal solution is washed with water and dried with sodium sulphate. After filtration a solution of hydrogen chloride in ether is added until no further precipitation occurs. 14.3 g. of the hydrochloride of the tropine ester of 10,11-dihydro-5H-dibenzo[a,d]cyclohepten-5-yl-acetic acid, melting at 221–222° after crystallization from a mixture of ethanol and diethyl ether, is obtained. The hydrochloride and also the maleate are hygroscopic salts. The oxalate salt melts at 220–221°.

In a similar manner but substituting an equivalent amount of 5H-dibenzo[a,d]cyclohepten-5-yl-acetic acid for the 10,11-dihydro-5H-dibenzo[a,d]cyclohepten-5-yl-acetic acid, the corresponding tropine ester of the first mentioned compound is prepared.

*Analysis.*—Calc. for $C_{27}H_{31}NO_6$: C, 69.66; H, 6.71; N, 3.01. Found: C, 70.0; H, 6.6; N, 3.2.

Example 2

Following the procedure described in Example 1, but substituting an equivalent amount of 2-dimethylaminoethanol for the tropine and an equivalent amount of 5H-dibenzo[acid]cyclohepten-5-yl-acetic acid for the 10,11-dihydro-5H-dibenzocyclohepten-5-yl-acetic acid, the 2-dimethylaminoethyl ester of 5H-dibenzo[a,d]-cyclohepten-5-yl-acetic acid is prepared. The hydrochloride of the ester melts at 170–172°. Yield 88%.

*Analysis.*—Calc. for $C_{12}H_{24}ClNO_2$: C, 70.47%; H, 6.76%; N, 3.91%. Found: C, 70.2%; H, 6.5%; N, 4.0%.

Example 3

Following the procedure described in Example 1, but substituting an equivalent amount of 1-methylpiperid-4-ol for the tropine and an equivalent amount of 5H-dibenzo[a,d]cyclohepten-5-yl-acetic acid for the 10,11-dihydro-5H-dibenzo[a,d]cyclohepten-5-yl - acetic acid, the 1-methylpiperid-4-yl ester of 10,11-dihydro-5H-dibenzo[a,d]cyclohepten-5-yl-acetic acid is prepared. The hydrochloride of the ester melts at 192.5–194.5°. Yield 70%.

*Analysis.*—Calc. for $C_{23}H_{26}ClNO_2$: C, 71.95%; H, 6.83%; N, 3.65%. Found: C, 72.3%; H, 7.1%; N, 3.6%.

Example 4

Following the procedure described in Example 1, but substituting an equivalent amount of quinuclidin-3-ol for the tropine, the quinuclidin-3-yl ester of 10,11-dihydro-5H-dibenzo[a,d]cyclohepten-5-yl-acetic acid is prepared. The hydrochloride of the ester melts at 222–225°. Yield 65%.

*Analysis.*—Calc. for $C_{24}H_{28}ClNO_2$: C, 72.44%; H, 7.09%; N, 3.52%. Found: C, 72.6%; H, 7.1%; N, 3.6%.

Example 5

Following the procedure described in Example 1 but substituting an equivalent amount of the substituted acids of Procedure I for the 10,11-dihydro-5H-dibenzo[a,d]

cyclohepten-5-yl-acetic acid, and utilizing the respective bases of Examples 1 to 4, there are obtained, respectively, the tropine ester, 2-dimenthylaminoethyl ester, 1-methyl-piperid-4-yl ester and quinucilidin-3-yl ester of the 10,11-dihydro-5H-dibenzo[a,d]cyclohepten-5-yl acetic acid with the substituents indicated below are obtained.

Substituted 10,11-dihydro-5H-dibenzo-[a,d]cyclohepten-5-yl acetic acid:
1-chloro
2-bromo
3-methyl
4-methyl
3-isopropyl
1-ethyl
1, 3-dimethyl
3, 7-dimethyl Similarly, utilizing the substituted acids of Procedure III, the tropine ester, 2-dimethylaminoethyl ester, 1-methylpiperid-4-yl ester and quinuclidin-3-yl ester of the 5H-dibenzo[a,d]cyclohepten-5-yl acetic acid with the substituents indicated below are obtained.

Substituted 5H - dibenzo[a,d]cyclohepten - 5-yl - acetic acid:
1-methyl
2-ethyl
3-t-butyl
2,4-dimethyl
2-isopropyl-10,11-dihydro In addition, substitution of other basic alcohols for those of Examples 1 to 4 will yield additional compounds of Formula I wherein $R_3$ corresponds to the basic group of the alcohol $R_3OH$.

The invention includes within its scope pharmaceutical preparations containing, as the active ingredient, at least one of the therapeutically active compounds of Formula I, or a physiologically acceptable acid addition salt thereof, in association with a pharmaceutically acceptable carrier. The preparations may take any of the forms customarily employed for administration of therapeutically active substances, but the preferred types are those suitable for oral administration and especially tablets, pills and capsules including the substance. The tablets and pills may be formulated in the usual manner with one or more pharamceutically acceptable diluents or excipients, for example lactose or starch, and include materials of a lubricating nature, for example calcium stearate. Capsules made of absorbable material, such as gelatin, may contain the active substance alone or in admixture with a solid or liquid diluent. Liquid preparations may be in the form of suspensions, emulsions, syrups or elixirs of the active substance in water or other liquid medium commonly used for making orally acceptable pharamceutical formulations, such as liquid paraffin, or a syrup or elixir base. The active substance may also be made up in a form suitable for parenteral administration, i.e. as a suspension or emulsion in sterile water or an organic liquid usually employed for injectable preparations, for example a vegetable oil such as olive oil, or a sterile solution in an organic solvent.

What is claimed is:

Quinuclidin-3-yl ester of 10,11-dihydro-5H-dibenzo-[a,d]-cyclohepten-5-yl-acetic acid.

References Cited

UNITED STATES PATENTS 3,014,911  12/1961  Engelhardt _____ 260—293

FOREIGN PATENTS 616,907  5/1962  Belgium.
858,187  1/1961  Great Britain.

WALTER A. MODANCE, *Primary Examiner.*

ALAN L. ROTMAN, *Assistant Examiner.*